(12) United States Patent
Pedoja

(10) Patent No.: US 7,968,025 B2
(45) Date of Patent: Jun. 28, 2011

(54) METHOD FOR MANUFACTURING A PARTICULARLY SOFT AND THREE-DIMENSIONAL NONWOVEN AND NONWOVEN THUS OBTAINED

(75) Inventor: Roberto Pedoja, Cuasso Al Monte (IT)

(73) Assignee: Ahlstrom Corporation, Helsinki (FI)

( * ) Notice: Subject to any disclaimer, the term of this patent is extended or adjusted under 35 U.S.C. 154(b) by 533 days.

(21) Appl. No.: 11/658,655

(22) PCT Filed: Jul. 29, 2004

(86) PCT No.: PCT/IT2004/000420
§ 371 (c)(1),
(2), (4) Date: Jan. 26, 2007

(87) PCT Pub. No.: WO2006/011167
PCT Pub. Date: Feb. 2, 2006

(65) Prior Publication Data
US 2009/0004942 A1    Jan. 1, 2009

(51) Int. Cl.
*D04H 1/54* (2006.01)
*D04H 1/50* (2006.01)
*D04H 3/10* (2006.01)
*D04H 3/14* (2006.01)
*D04H 13/00* (2006.01)

(52) U.S. Cl. ... 264/168; 442/382; 442/401; 264/211.12; 264/173.16; 264/210.1; 264/175; 264/132; 264/119; 264/120; 264/122; 425/373

(58) Field of Classification Search .................. 264/168, 264/119, 120, 122, 517; 425/373
See application file for complete search history.

(56) References Cited

U.S. PATENT DOCUMENTS

| | | | | |
|---|---|---|---|---|
| 1,578,609 A * | 3/1926 | Mason | ............................ | 162/21 |
| 4,333,979 A * | 6/1982 | Sciaraffa et al. | ............... | 428/179 |
| 5,004,511 A * | 4/1991 | Tamura et al. | ............. | 156/89.26 |
| 5,970,583 A * | 10/1999 | Groten et al. | ................... | 19/296 |
| 6,036,909 A * | 3/2000 | Baum | .......................... | 264/280 |
| 6,800,226 B1 * | 10/2004 | Gerking | ....................... | 264/40.3 |
| 2001/0044611 A1 * | 11/2001 | Noda et al. | ..................... | 604/367 |
| 2002/0013111 A1 | 1/2002 | Dugan et al. | | |
| 2003/0010228 A1 * | 1/2003 | Lofink | ......................... | 100/160 |
| 2004/0116031 A1 * | 6/2004 | Brennan et al. | ............... | 442/401 |

FOREIGN PATENT DOCUMENTS
WO    WO 0100909 A1 *    1/2001
WO    WO 03/048440        6/2003

* cited by examiner

*Primary Examiner* — Jennifer K. Michener
*Assistant Examiner* — Magali P Slawski
(74) *Attorney, Agent, or Firm* — Dickstein Shapiro LLP

(57) ABSTRACT

The present invention relates to a method for manufacturing nonwoven and nonwoven obtainable by said method. Particularly, the invention relates to a nonwoven provided with improved tactile and absorbent characteristics, which make it suitable for use in the field of surface cleaning, personal hygiene, or formation of garments.

37 Claims, 16 Drawing Sheets

METHOD FOR MANUFACTURING A PARTICULARLY SOFT AND THREE-DIMENSIONAL NONWOVEN AND NONWOVEN THUS OBTAINED

FIELD OF THE INVENTION

The present invention relates to a method for manufacturing a nonwoven of the "spunbonded" and/or carded type in-line and off-line and a nonwoven obtainable by said method. Particularly, the invention relates to a nonwoven provided with such improved tactile, thickness and absorbance characteristics that make it suitable for use in the field of surface cleaning, personal hygiene, and formation of garments.

BACKGROUND OF THE ART

A nonwoven is widely used as a replacement for traditional textile products in numerous sectors, for example in the field of surface cleaning and protection, or in the production of garments. Compared to conventional fabrics, the nonwovens have the advantage of lower production costs, outstanding mechanical properties and a high biocompatibility with skin.

Among the nonwovens, those of the spunbonded type are formed either by synthetic (polymer) or natural material fibers which are laid on a mat while still being in a molten state and then left to solidify in the form of a layer.

The thus obtained structure can be consolidated by dynamic treatments such as bonding by stitches or by weft (calendering), or by jets of water (hydro-entanglement). Other bonding methods known in the field are mechanical needling, thermobonding, chemical bonding.

Generally, the spunbonding methods provide the extrusion of thermoplastic polymers through spinnerets such as to form a plurality of continuous filaments. These filaments, which are first solidified and then elongated, typically by means of a high-speed fluid, are random laid on a collecting surface such as a conveyor belt and form a non-consolidated ply. Subsequently, the filaments are bonded to provide the final ply having cohesion and strength characteristics.

The bonding step can be obtained by directly applying heat and pressure to the non-consolidated ply by means of heated calenders.

Particularly, after the non-consolidated ply has been laid down, it is carried on said conveyor belt to the calenders where it leaves the belt and is taken by two calender rolls to be heated and crushed. Thereby, the polymer ply is only carried until reaching the calenders and both rollers of the same calenders also act as the supports/conveyors as well as consolidators for the ply.

The product resulting from said method is normally in the form of a very thin ply, in the range of 0.18-0.3 mm weighing 15-17 g/m$^2$, compact, of threadlike appearance, and provided by slightly embossed patterns defined by the gaps between the cohesion points of the calender design.

Such a product, though showing good cohesion properties, is not very suitable for use in the hygiene sector, and however in those sectors requiring particular performance in terms of softness and thickness.

SUMMARY OF THE INVENTION

Therefore, the object of the present invention is to provide a nonwoven which is provided with improved softness and thickness properties compared to known products though still retaining optimum cohesion properties.

This object is achieved by a method for manufacturing a nonwoven and a nonwoven thus obtained, such as claimed in the independent claims annexed below.

A first object of the present invention is to provide a method for manufacturing a nonwoven of the spunbonded and/or carded type.

A second object is to provide a nonwoven obtained by said method, wherein the end product is particularly advantageous in terms of softness, thickness, and cohesion.

BRIEF DESCRIPTION OF THE DRAWINGS

Further characteristics and the advantages of this invention will be better understood from the following detailed description of some embodiments thereof, which are provided by way of non-limiting examples wherein.

DETAILED DESCRIPTION OF THE INVENTION

Figure 1:
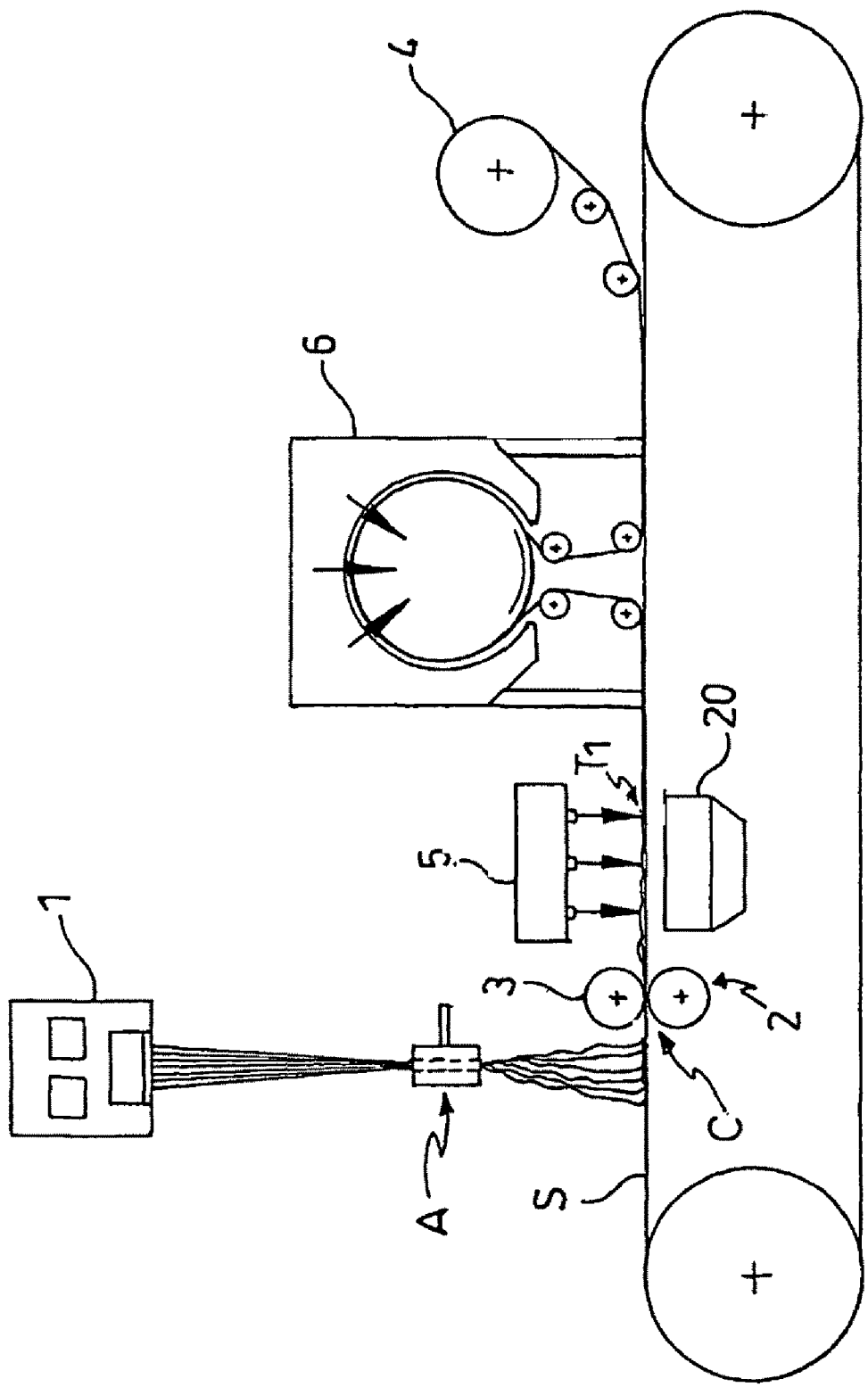
FIG. 1 is a schematic view of a manufacturing process according to the invention.

With reference to FIG. 1, the method for manufacturing spunbonded and/or carded nonwoven in accordance with the present invention comprises the following sequential steps:

a) laying at least one layer $T_1$ of continuous thread fibres or microfibres on a suitable support S;

b) treating said layer $T_1$ such as to obtain an increase in the thickness thereof.

Preferably, step b) takes place by said layer $T_1$ passing between two rollers on a support having a surface in contact with said fibres which is provided by ribs alternated with grooves.

By the term "continuous thread fibres or microfibres" is meant herein continuous fibres consisting of one or more polymer components, either synthetic or natural, optionally splittable into continuous-thread individual microfibres, or filaments. Exemplary polymer fibres splittable into microfibres are splittable multi-component polymer fibres and exploded polymer fibres which generate thinner fibres than those from which they are derived in accordance with technologies which will be discussed below.

Step b) of treatment to obtain an increased thickness of the nonwoven layer may be called, in other words, "thickening", thereby meaning an operating step allowing to turn the fibres or microfibres of a spunbonded or carded nonwoven laid on a support in the form of a thin, threadlike, and non-consolidated ply into a non-consolidated or poorly consolidated ply (pre-consolidation) of a cotton wool-like, thick, and soft appearance.

It has been surprisingly found that if the thickening step of the nonwoven continuous-thread fibres or microfibres is carried out on a rib-operated, i.e. embossed, and however not smooth support, the resulting ply gains unexpected properties of softness and thickness which are considerably increased compared to any other nonwoven ply of the spunbonded or carded type.

On the basis of this result, different variant embodiments of a nonwoven of the spunbonded type, both single-layer and multi-layer, have been provided.

For the production of a single layer (FIG. 1), the manufacturing steps generally comprise feeding the nonwoven layer $T_1$ in the form of fibres or microfibres by means of a spinneret 1 (extruder) coupled to a conventional suction fan A, a hydro-entangling station 5, a drying station 6 and a rewinding station 4 of the hydro-entangled layer on a roller.

Particularly, step a) of laying a single layer comprises, such as schematically represented in FIG. 1, extruding the nonwoven layer $T_1$ in the form of continuous thread fibres by means of a spinneret 1 (extruder) and laying said fibres on a suitable support S by means of a conventional suction fan A.

Step b) of thickening is preferably carried out by passing the layer $T_1$, supported by support S, between two rollers 2 and 3 of a conventional compactor or embosser C.

It should be noted that by the term compactor or embosser is meant herein a device known per se, such as described below, which has only the function of changing the surface of a nonwoven ply thus obtaining a slight consolidation (pre-consolidation) e, in the case of embosser, such as to form patterns, writings or drawings in relief. In other words, the compactor would have a pre-consolidation function, actually weak, whereas the embosser would have a preconsolidation and ornamental function, thereby increasing the thickness of the ply. On the contrary, the calender, though being provided with a similar structure, has the basic function to consolidate, and bond the fibres composing the nonwoven while minimizing or at most maintaining the ply thickness being laid down.

Preferably, roller 2 of the compactor generally has a thermoplastic smooth rubber surface for the layer $T_1$ to be pressed thereon, which layer is supported by support S, by means of roller 3. Roller 3 is normally made of smooth metal materials. Moreover, roller 3 is heated to the polymer fibres melting temperature. Accordingly, due to the mechanical action of both rollers, the heating of polymer fibers and the three-dimensional support (mat interposed between both cylinders) the thickening of the nonwoven layer $T_1$ or, in other words, a "volumizing effect", a "flimsy effect" is surprisingly obtained. In the case where an ornamental appearance is also desired, the embosser may be used, where the support S has deeper, more marked ribs and respective grooves, i.e. the ornamental matrix, such as to obtain the desired ornamental effect.

On the other hand, roller 3 in a conventional calender is engraved, i.e. it has ribs in the form of dots or dashes evenly alternating with grooves.

As already explained above, these ribs in the calender act by forming melting points. Moreover, in the calender, the nonwoven ply is not supported by any support. On the contrary, either in the compactor device or in the embosser, ribs on rollers are not provided. On the other hand, there is provided a support S having a three-dimensional surface which gives considerable thickness, softness, and the above mentioned cotton wool-like appearance.

Support S can be a single continuous support stretching beneath all the nonwoven working stations and is advantageously provided with a surface in contact with the fibres or microfibres, which is provided by ribs alternating with grooves. Non-limiting examples of said support S can be those represented in FIGS. 5a and 5b where the contact surface with said fibers of microfibres has a section with crimps or steps according to what has been described in the international patent application PCT/IT2004/000220 in the name of the same applicant. Alternatively, the ribs can be either dots or dashes.

Accordingly, as described above, when the nonwoven fibres are passed between two rollers 2 and 3 while being supported by a support S such as that described above, the resulting ply acquires softness, smoothness and thickness similar to cotton wool.

It would appear that this particular effect is due to the use of the support uneven surface which to some extent would cause the cotton wool-effect of the ply rather than the typical consolidation resulting from the calender, such as described above.

In any case, the combination of the mechanical (pressure and dragging) and physical (heating) actions performed by the compactor C with the mechanical action by the support S on the fibres is probably responsible for the surprising result obtained.

Accordingly, the effect described above can be created by employing a support surface having ribs of substantially any shape and that can be passed with nonwoven fibres between the rollers of a compactor or embosser according to conventional procedures. In any case, the support S should be sufficiently solid to withstand the operating pressure of rollers 2 and 3 and withstand the fibre melting temperature.

Therefore, the support S described above can be a conveyor belt or tape made of any type of plastic material which is normally used in the field. Preferably, the support S is a metal sheet or a hard heat-resistant plastic sheet. Preferably, support S can further consist of a punched sheet through which the air can be sucked in order to maintain the fibres adherent to said sheet while they are being worked.

This support S can alternatively be a closed conveyor belt (not shown) limited to the level of rollers 2 and 3 of compactor or embosser C. Thereby, the fibres can be laid on a conventional support which carries said fibres to said conveyor belt such as to deliver the fibres thereto and allow the thickening treatment to be carried out in the advantageous conditions described above.

Following the passage of ply $T_1$ of spunbonded and/or carded nonwoven supported by support S through the compactor C, the ply $T_1$ passes underneath the hydro-entangling machine 5 to be consolidated (step c)) in accordance with widely established methods. Subsequently, the ply $T_1$ is conventionally dried in dryer 6 (FIG. 1).

In addition, such as shown in FIG. 1, the fabric ply $T_1$ can be wound around a winding roller 4, also of the conventional type.

The fibre forming the inventive nonwoven can also be a non-continuous fibre (staple fiber) manufactured by traditional carding machines such as 1, 5 to 7 mm fibre in PES, PP, PLA, VISCOSE, LYOCELL, TENCELL, or COTTON.

Further technologies used to manufacture an advantageous fibre according to the invention, comprise:
a. production of bi-component synthetic polymer fibers (multi-segments), that can be split with a hydro-entangling machine;
b. production of synthetic polymer fibers with explosion effect, for example polyester, polypropylene, polyethylene (technology known as "Nanoval");
c. production of natural fibers with explosion (such as Lyocell, PLA, etc.) by "Nanoval" technology described above.

Particularly, the single- or multi-layer nonwoven can be of the hydro-entangled type based on exploded continuous thread or splittable multi-component continuous thread fibers. The nonwoven fibres generally consist of only one component; however, for particular applications they may also be manufactured in the multi-component form, through the joint extrusion of different polymers.

For example, the multi-layer composite nonwovens are those containing one or more nonwoven layers, associated to a layer of cellulose fibres: in such cases, the final composite advantageously combines the mechanical properties of the nonwoven with the absorbent properties of the cellulose fibres.

The above technologies are described in the patent application PCT/IT2004/000220 in the name of the same applicant and fully incorporated herein by reference. Particularly, those technologies applied to the thickening method in accordance with the present invention are described herein. It should be noted that the technologies relate to synthetic or natural polymer fibres, either splittable or exploded in microfibres. However, these fibres can be replaced with normal fibres of the spunbonded type such as obtained by conventional technologies or with carded fibres of the staple fibre type, and they can be worked following the same steps in accordance with the present invention such as described in detail herein below.

1. Production of Splittable Synthetic Polymer Fibers

For the production of a single layer, reference is made to what is illustrated in FIG. 1, where the difference from the method described above is that the spinneret 1 employed is herein a device, known per se, which is capable of manufacturing polymer fibres splittable into microfibres.

For the details of each step, reference should be made to the description below, with reference to FIGS. 2, 3 and 4 in which the steps with similar names are identical to those outlined above.

The method for manufacturing a nonwoven, according to this first variant embodiment of the invention, comprises the manufacturing steps a) to b) such as described above, in which the fibres laid in step a) comprise splittable multi-component polymer fibres which split into mono-component fibres by entangling to one other during the consolidation step by hydro-entanglement.

Figure 2:
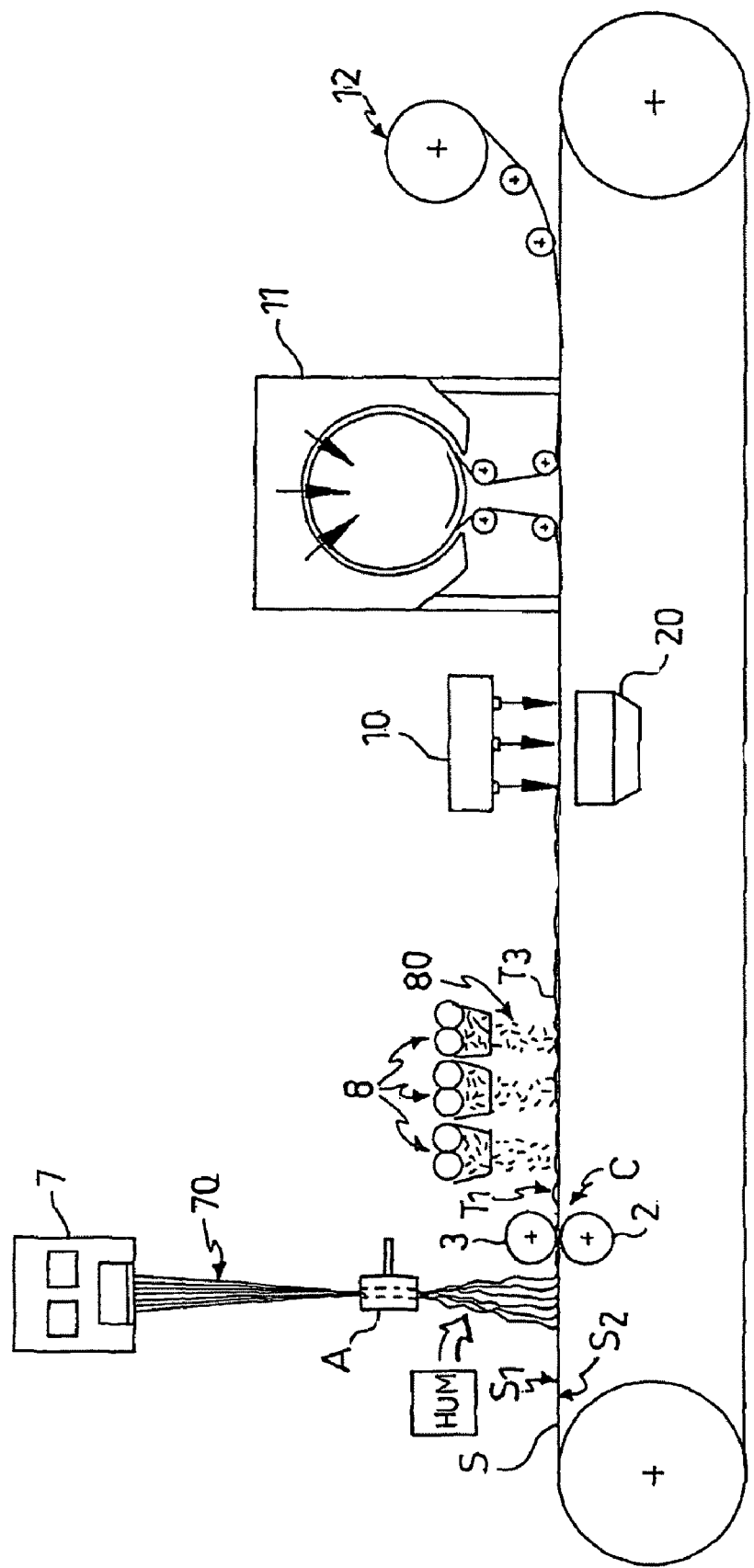
FIG. 2 is a schematic view of a manufacturing process in accordance with a first variant embodiment of the invention.

According to a variant embodiment of the invention, such as illustrated in FIG. 2, the method provides a further step of laying at least one layer of absorbent material fibres $T_3$ on said at least one layer $T_1$ subsequent to the thickening step b), therefore the hydro-entangling step takes place such as to obtain a nonwoven in which the multi-component polymer fibers split into mono-component micro-fibers entangle with one another and with the fibers of the absorbent material.

Generally, said method provides feeding the nonwoven first layer $T_1$ through a suitable spinneret 7, one or more stations 8 for laying the cellulose pulp 80, hydro-entanglement 10, drying 11 and rewinding on a roller 12.

On the other hand, the manufacture of a three-layer composite in accordance with the invention (FIG. 3a where the same reference numbers as those from FIG. 2 designate similar operating equipment or stations) generally provides feeding the first nonwoven layer $T_1$ through a suitable spinneret 7, one or more stations 8 for laying the cellulose pulp 80, laying a second nonwoven layer $T_2$ through a suitable spinneret 9, hydro-entanglement 10, drying 11 and rewinding on a roller 12.

Referring to a multi-layer product, it is widely known that splittable multi-component fibers may be produced through extrusion by spinnerets of polymer materials so as to form continuous fibers, in accordance with the technology a. identified above. These fibers, on output from the spinnerets, are hit by a jet of compressed air that causes the elongation and the electrostatic charging thereof such to cause a mutual repulsion causing them to fall randomly onto a conveyor belt.

Figure 3A:
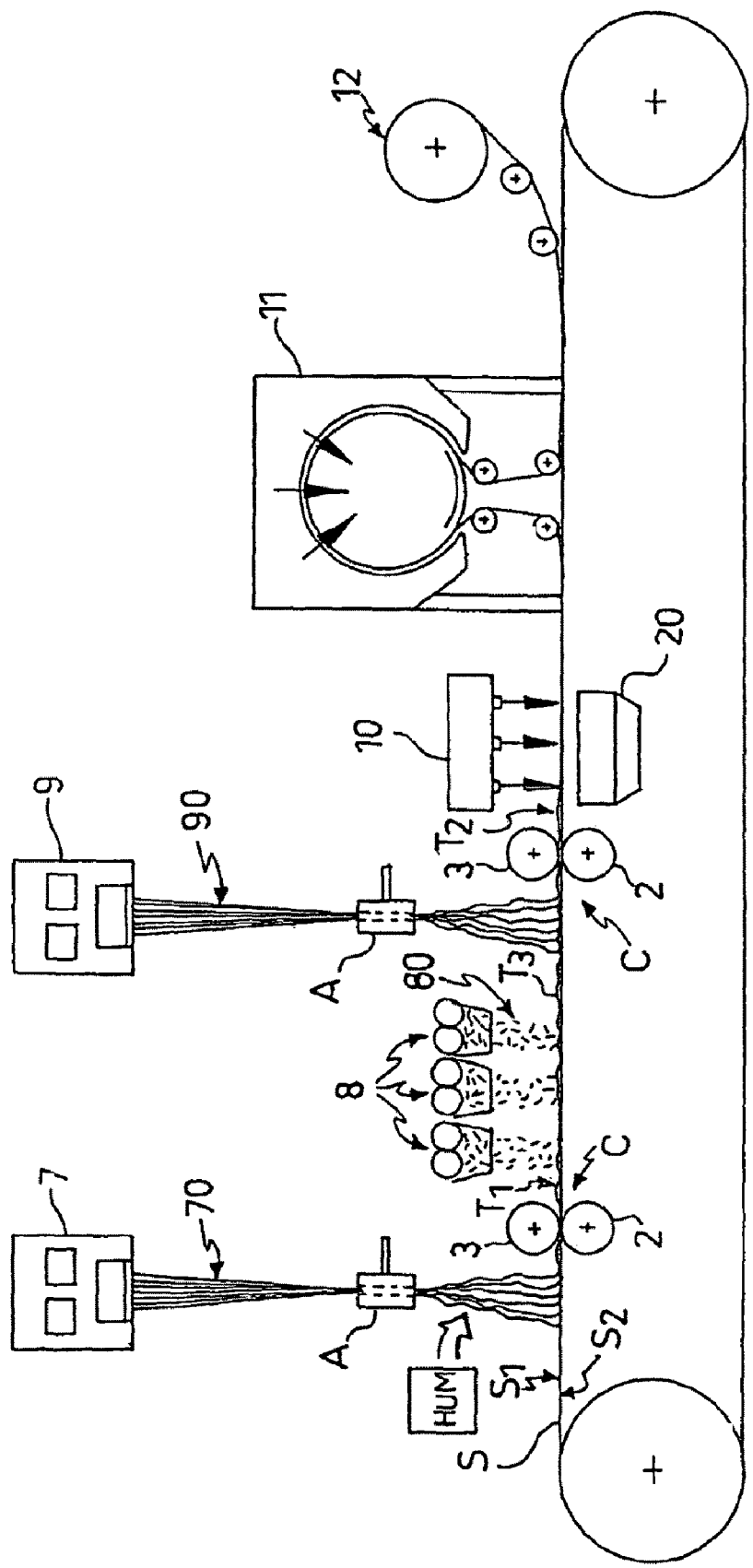
FIG. 3a is a schematic view of a manufacturing process in accordance with a second variant embodiment of the invention.

With reference to FIG. 3a, a method for the production of multi-layer nonwoven fabric comprising outer layers made with splittable fibers according to the abovementioned technology will be now described. In any case, the subject method comprises the following steps:
a) laying at least one layer $T_1$ of continuous thread splittable multi-component polymer fibers on a suitable support S;
b) treating said layer $T_1$ such as to obtain an increase in the thickness thereof;
c) laying on said at least one first layer $T_1$ at least 0.20 one layer $T_3$ of absorbent material fibres 80;
d) laying at least one second layer $T_2$ of splittable multi-component polymer fibers on said at least one layer of absorbent material fibres $T_3$;
e) treating said layer $T_2$ such as to obtain an increase in the thickness thereof;
f) consolidate said layers $T_1$, $T_2$ and $T_3$ by hydro-entanglement.

Preferably, step b) and step e) take place by said layer $T_1$ and said layers $T_1$, $T_2$ and $T_3$, passing between two rollers, respectively, onto a support having a contact surface to said fibres being provided with ribs alternating with grooves.

As stated above, the hydro-entanglement of the laid fibre layers takes place such as to obtain a multi-layer nonwoven wherein the multi-component polymer fibres are split into single mono-component micro-fibres entangling with one another and with the fibres of the absorbent material.

Particularly, splittable multi-component synthetic fibres can be formed by separately extruding individual polymers in a molten state in the form of threads 70, 90 exiting from orifices, of capillary dimensions, of a spinneret 7, 9 and linking them beneath the spinneret. The polymers at the molten state are linked in a single fiber combined by extrusion of the individual polymer threads in such directions to cause the contact thereof and the adhesion thereof, such as described in U.S. Pat. No. 6,627,025. A suction fan A positioned underneath the spinneret has the function of sucking and conveying the individual threads of extruded polymer in order to favour the bonding thereof into a single fiber.

The synthetic fibers may be composed of at least two threads of a single polymer up to 16 threads of different polymers (bi-component), be they homopolymers, copolymers or blends thereof. The polymers may be selected from polyesters, polyamides, polyolefins, polyurethane, polyester modified with additives, polypropylene, polyethylene, polypropylene terephthalate, polybutylene terephthalate.

Preferably, such polymers may be selected such that in the fibers adjacent polymers cannot blend or in any case have poor affinity in order to favour the subsequent separation thereof. Alternatively, the polymers may be additized with lubricants that prevent the adhesion thereof. In addition, as the longitudinal, axial portion of the fiber usually has a greater force of cohesion than the peripheral portion, it may be advantageous to spin multi-component fibers so as to leave an axial hole or in any case a weakened axial portion.

As shown in FIG. 3a, once a layer of splittable multi-component polymer fibers has been laid through the special spinneret 7 onto a conveyor belt S such as to create a first layer of spun-bonded nonwoven $T_1$, one layer of absorbent material $T_3$ such as cellulose pulp is laid on said layer of nonwoven.

Subsequently, a second layer $T_2$ of nonwoven substantially identical to that prepared previously is laid on the layer of cellulose pulp $T_3$, such as illustrated in FIG. 3 at the station identified with reference number 9.

At this point, the fibers are subject to hydro-entangling at the hydro-entangling station 10. This treatment, widely known per se, advantageously enables to split the polymer fibers that compose the nonwoven outer layers nonwoven in micro-fibers and to entangle them with one another and with the cellulose pulp fibers.

Preferably, the hydro-entangling is made not only on side $S_1$ of the support S on which the fibers are laid but also on side $S_2$, opposite side $S_1$, through special through holes (not shown in the figures) and suitable equipment positioned on said side $S_2$ (not shown).

FIGS. 1 to 3 also schematically represent a conventional filtering device 20 for the water originating from the hydro-entangling machines positioned after the cellulose pulp laying step. Said device has the function of recovering the water of the hydro-entangling machine and filtering it of any cellulose pulp fibers besides filtering the chemical components that are contained in the fibers and may be released in the course of hydro-entanglement.

Figure 3B:
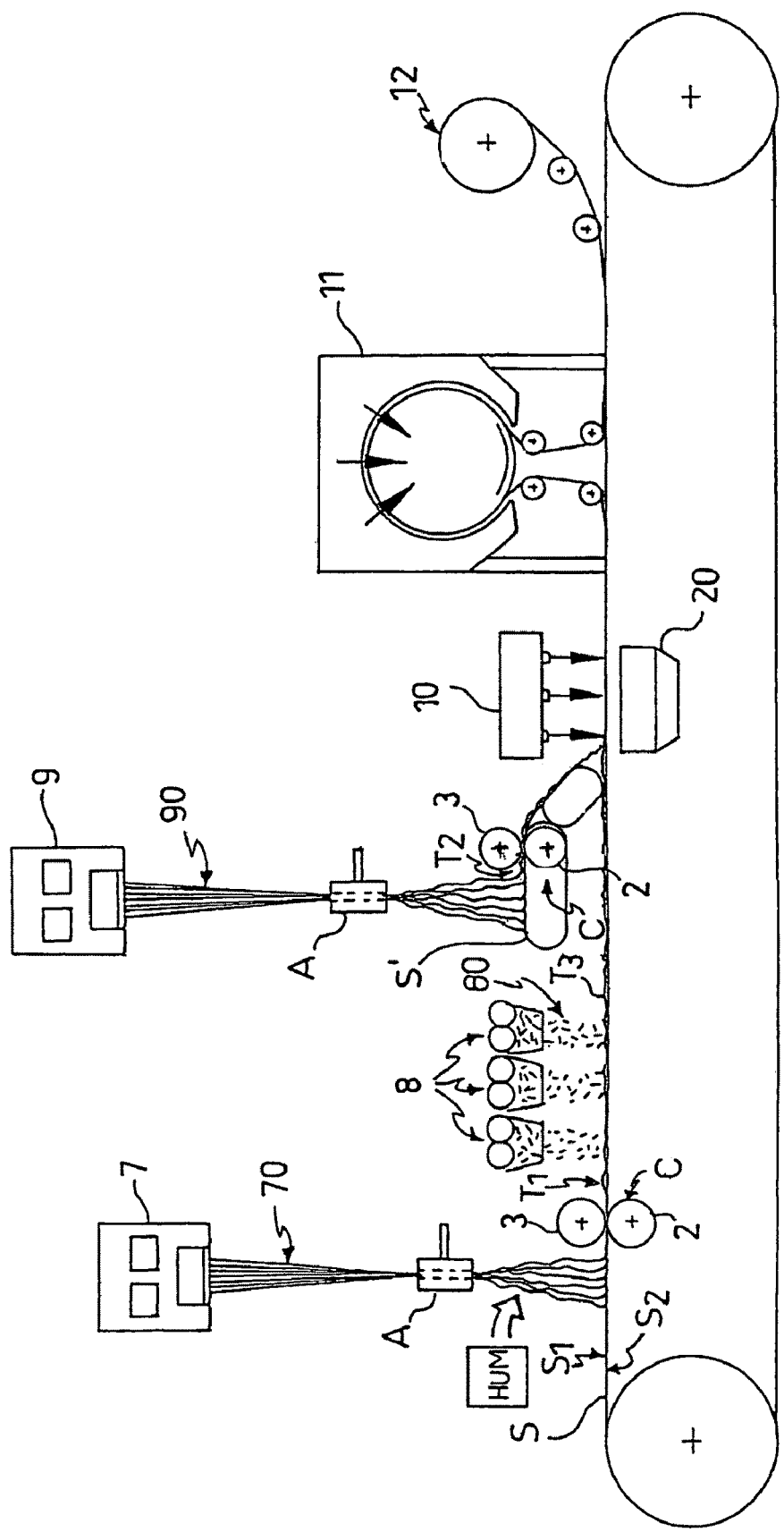
FIG. 3b is a schematic view of a manufacturing process in accordance with a third variant embodiment.

In accordance with a further variant embodiment of the invention, FIG. 3b illustrates a support S', identical to that described above, on which the second layer $T_2$ of nonwoven fibers is laid. As will be seen, said S' is at a different level from support S on which the first layer $T_1$ is laid. Thereby, the second layer $T_2$ can be separately subjected to thickening (embossing). Thickening only layer $T_2$ is advantageous in that two substantially even layers can be obtained.

Subsequently to the thickening treatment, the layer $T_2$ is carried and laid on the layer of absorbent material fibers $T_3$, by support S' or by a conventional conveyor belt, such as described above, and the three layers are subjected together to hydro-entanglement.

The drying step in the dryer 11 and the final winding on roller 12 take place as described above.

2. Production of Exploded Synthetic Polymer Fibers

The process for the production of nonwoven based on exploded polymer fibers comprising the same steps described with reference to the production of nonwoven based on splittable polymer fibers, to which reference should be made. In this case, the difference lays in the type of technology adopted to manufacture the fibre layers $T_1$ and $T_2$ which allows to obtain exploded microfibres which, after they have been subjected to thickening, entangle to one another and optionally with the absorbent material fibers.

According to Nanoval technology, the explosion of the fiber (just extruded at the molten state) is obtained when it comes into contact with air at room temperature.

Generally, as described in patent application WO 02/052070, Nanoval technology consists in producing molten polymer threads that protrude from spinning holes arranged in one or more rows placed in a chamber with a given pressure separated from the outside environment and filled with gas, generally air. Said threads come to an area of rapid acceleration of this gas when exiting from the camera, the outlet being made in the form of a Laval nozzle.

The raw materials that can be spun are both of natural origin, such as cellulose Lyocell, PLA, and synthetic or such as polypropylene, polyethylene, polyamide, polyester.

With regards to the laying of the exploded fibers to form a first layer and the further manufacturing steps, the same references are valid as made to FIGS. 1, 2 and 3 in cui in which the suction fan A is eliminated and the spinnerets 5, 6, 7 and 9 are each fitted with the abovementioned Laval nozzle (not shown) in order to obtain the explosion effect.

The advantage of use of the Nanoval technology lies in the possibility of producing very fine micro-fibers with diameters of less than 10 μm, for example between 2 and 5 μm.

A further advantage also in relation to the technology that employs splittable polymer fibers lies in the fact that a greater density of individual micro-fibers per each fiber is obtained. In other words the fiber divides into a number of components at equal initial diameters, i.e. the micro-fibers (filaments) that are obtained are at least 10 times finer, preferably up to 100 times finer.

Regardless of the type of traditional spunbonded or splittable or exploded fibre used, or carded fibre, in the case one wishes to pre-entangle the nonwoven before bonding it into the form of a multi-layer composite (FIGS. 4a and 4b), the steps are as follows: laying the first layer $T_1$ by means of the spinneret 13 or a carding machine, pre-hydro-entangling through equipment 14, drying through equipment 15, laying cellulose pulp $T_3$ through equipment 16, laying the second layer $T_2$ through spinneret 17 or carding machine, hydro-entangling with hydro-entangling machine 18, drying through equipment 19 and rewinding onto a roller 21.

The manufacturing method and plant may as well provide a dewatering step or station 22 associated to the drying step or station. The advantage of a pre-hydro-entangling step is that it allows to create a first layer of spunbonded polymer fibers, either split or exploded, that, thanks to the greater density of the entangling of the micro-fibers of said fiber, favours the laying of fibers of absorbent material and prevents the partial loss thereof through spaces too wide, which are left by prior art technologies.

As mentioned previously, the step of laying fibers of absorbent material is preferably made with cellulose pulp fibers having a length that may vary from 0, i.e. cellulose powder, to 2.5 mm, preferably from 1 to 2 mm.

In addition, the process according to the invention may provide a drying step after the hydro-entangling step and, preferably also after the pre-hydro-entangling step.

A further step may consist in the elimination of the water contained in the fibers by means of a dewatering step. Particularly, said step consists in arranging a condenser 22 below support S and for example at dryer 15 to which an entirely conventional suction fan (not shown) is usually coupled up. The air sucked through the holes made on said support is conveyed into said condenser where it releases the water contained therein. Equipment of this type is described for example in patent application PCT/IT2004/000127 of the same applicant.

The method may also comprise an embossing step to make products with patterns of the multi-layer nonwoven. Particularly, the embossing may consist in a calendering treatment made by making the nonwoven being heated and pass under pressure between a pair of engraved rollers, in accordance with conventional techniques, or through a further step in a hydro-entangling machine. It should be noted that the term "embossing step" is not referred to a consolidation of the nonwoven as occurs according to the prior art mentioned previously but is simply enabling to make captions and/or three dimensional drawings in order to tailor or decorate the nonwoven through a "thermo-embossing" or "hydro-embossing" calender, in this case in the hydro-entangling process.

Preferably, the process comprises sucking the air at room temperature through the abovementioned through holes (non shown in the drawings) made in the support S for the fibers. In this way, the splittable or exploded polymer fibers, laid at the molten state, are cooled and cured. In the case in which exploded fibers are used a humidifier HUM (schematically shown in FIG. 3a and in FIG. 3B) can be arranged for the exploded fibers to be humidified immediately before laying them on the support S either to favour or improve the softness of the end product.

Still more preferably, said method may comprise one or more of the following final steps, known per se, in order to increase or add additional characteristics to the end product: coloring or finishing of a chemical nature as the anti-pilling treatment and the hydrophilic treatment, antistatic treatment, improvement of flame proof properties, substantially mechanical treatments such as napping, sanforizing, emerizing.

In addition, the nonwoven may be subject to a further process of multicolor printing using the equipment described in patent application PCT/IT2004/000127 in the name of the same applicant. In this case, a nonwoven sheet at the end of the process described above may be printed directly in-line following the steps of:

providing equipment for nonwoven printing comprising a moving support for the transport of said nonwoven and at least one moving print organ;
feeding said nonwoven sheet to said equipment;
performing the printing on said nonwoven under the command and control of a command and control unit, in which said command and control unit is operatively connected with said support and at least one printing organ in order to detect electrical signals originating from said support and at least one print organ, transforming said signals into numerical values representative of the state of their angular speed and torsional moment, comparing said numerical values with ratios of preset numerical values of said angular speeds and torsional moments and sending signals to said support and at least one print organ in order to correct any variation of said values that fall outside said ratios.

Finally, the process in accordance with the present invention may comprise a step of winding the nonwoven onto a roller 21.

The method of the present invention enables to obtain various types of product:

A. single-layer fabric with basic weight of between 8 and 50 g/m². The manufacturing method is such as illustrated in FIG. 1. The fiber used may be either a synthetic fiber with explosion effect, as described above and obtained according to the Nanoval technology, or it may be a bi-component (multi-segments) synthetic fiber, splittable with a hydro-entangling machine, or a natural fiber with explosion (for example, Lyocell, PLA, etc.), also produced with "Nanoval" technology, or it may be simply a normal spunbonded fiber.

B. multi-layer fabric with single-layer hydro-entangling or three-layer hydro-entangling with or without pre-hydro-entanglement. For example, the product may be a three-layer multi-layer one, of which one central cellulose pulp layer and the outer layers with different combinations of the technologies illustrated above (20 to 200 g/m²).

Figure 6A:
FIG. 6A is a photograph of a nonwoven obtained by the known technique.
Figure 6B:
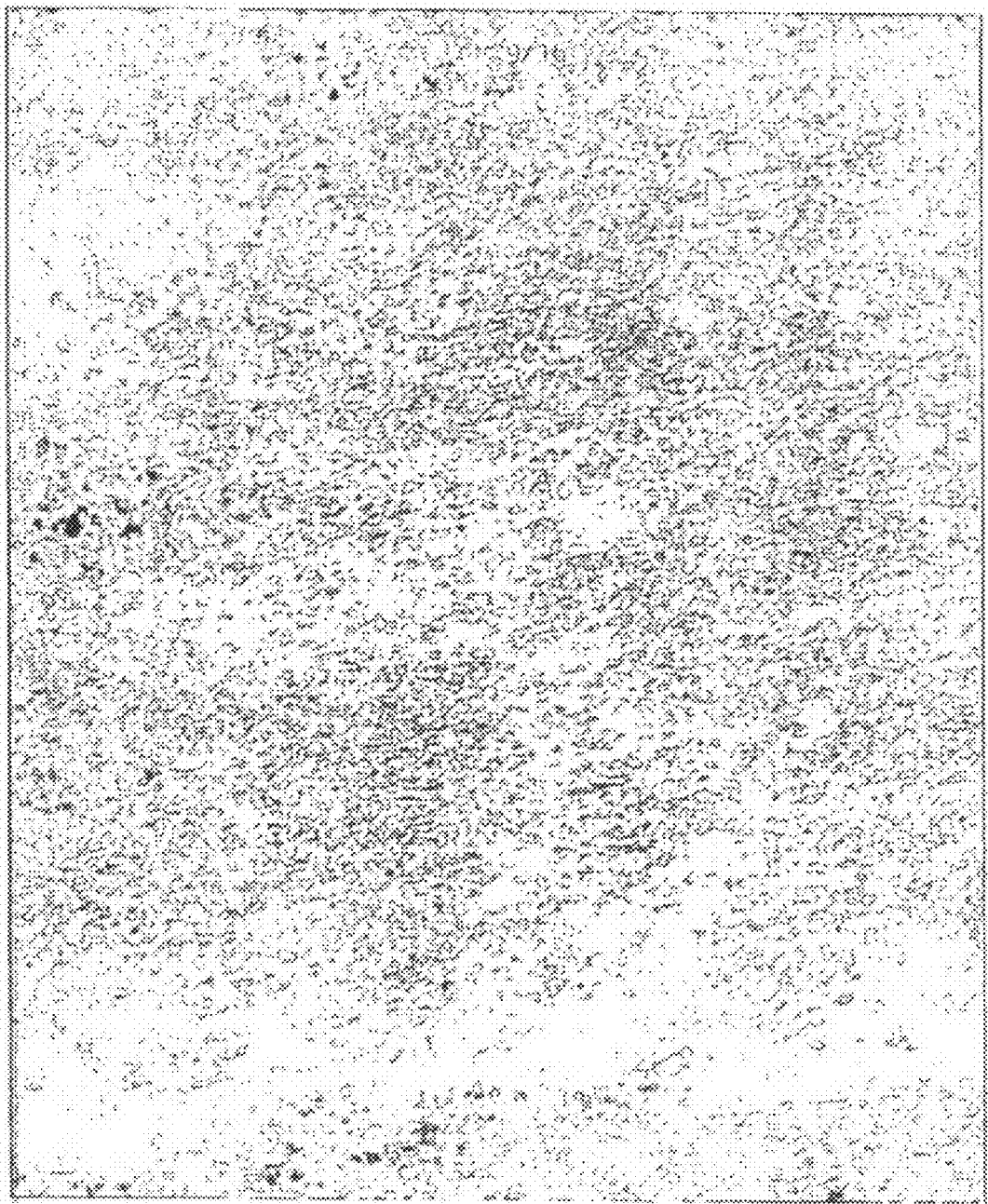
FIG. 6B is a photograph of a nonwoven obtained in accordance with the invention.

In any case, regardless of the type of single-layer or multi-layer nonwoven, the tactile and visual characteristics of the individual ply, either spunbonded or carded, which forms it and differentiate it from any other ply comprise, weights being equal, a 3-5 times greater thickness, softness and smoothness similar to cotton and a cotton wool-like appearance, i.e. similar to a mellow and delicate flock, such as illustrated in FIG. 6B.

On the contrary, such as illustrated in FIG. 6A, the nonwoven for example spunbonded manufactured in accordance with prior art has a threadlike appearance, is compact, thin and without softness.

Particularly, and by way of non-limiting examples, exemplary fibers obtainable in accordance with the inventive method are described below.

I. Splittable Multi-component Spunbonded Polymer Synthetic Fibers

Preferably, the splittable multi-component polymer fibers are composed of micro-fibers or filaments of polymer such as those described above with reference to the manufacturing method. The micro-fibers may have a diameter of between 0.1 dTex and 0.9 dTex and the corresponding fibers may vary according to the number of micro-fibers that compose it but generally are of dimensions of between 1.7 dTex and 2.2 dTex. The number of micro-fibers in said fibers generally ranges between 2 and 16 (bi-component products).

As to a three-layer nonwoven having an inner layer of cellulose pulp fibers and two outer layers of polymer fibers consisting of two different splittable polymer components such as polypropylene/polyethylene, analytical tests have shown the following physical characteristics:

weight in grams per square meter ranging between 50 and 100, preferably between 55 and 65;
tensile strength in the machine direction expressed in Newton per 5 cm (N/5 cm) between 50 and 150, preferably between 60 and 120, whereas in the cross-direction between 20 and 75, it is preferably between 30 and 65;
elongation, calculated as a percentage of the length in a relaxed state, ranged between 35% and 85% in machine direction (MD), preferably between 45% and 75%, whereas it ranged between 70% and 100% in the cross-direction (CD), preferably between 80% and 90%;
final content of the cellulose pulp fiber ranged between 50% and 75% of the total weight of the nonwoven;
power of absorption calculated as a percentage of total weight in relation to the weight of the dry nonwoven was between 600% and 700% (according to the percentage of pulp in the end product).

II. Spunbonded Exploded Polymer Synthetic Fibers

Referring to the exploded fibers, it has been observed that the micro-fibers (filaments) have a diameter ranging between 1 micron and 5 micron, preferably between 2 and 4 micron. Obviously said values may vary according to the type of preset characteristics for the end product and will depend on the production parameters selected, as described previously, and in any case known to those skilled in the art.

Regardless of the type of polymer fibers used, the final thickness of the multi-layer nonwoven advantageously reaches values of up to 0.65 mm and a tensile strength of 27 N/5 cm (in the manufacturing line cross-direction).

The products obtained according to the present invention have a plus of resistance, softness, thickness and have a better appearance. Besides the thickness is increased either by the explosion effect (Nanoval technology), or (splittable fibers) by the split effect. Particularly, the abovementioned characteristics result from the combination of the use of a support S such as that described above to support a ply of fibres or microfibres during the passage between both rollers of a compactor or an embosser.

Figure 5A:
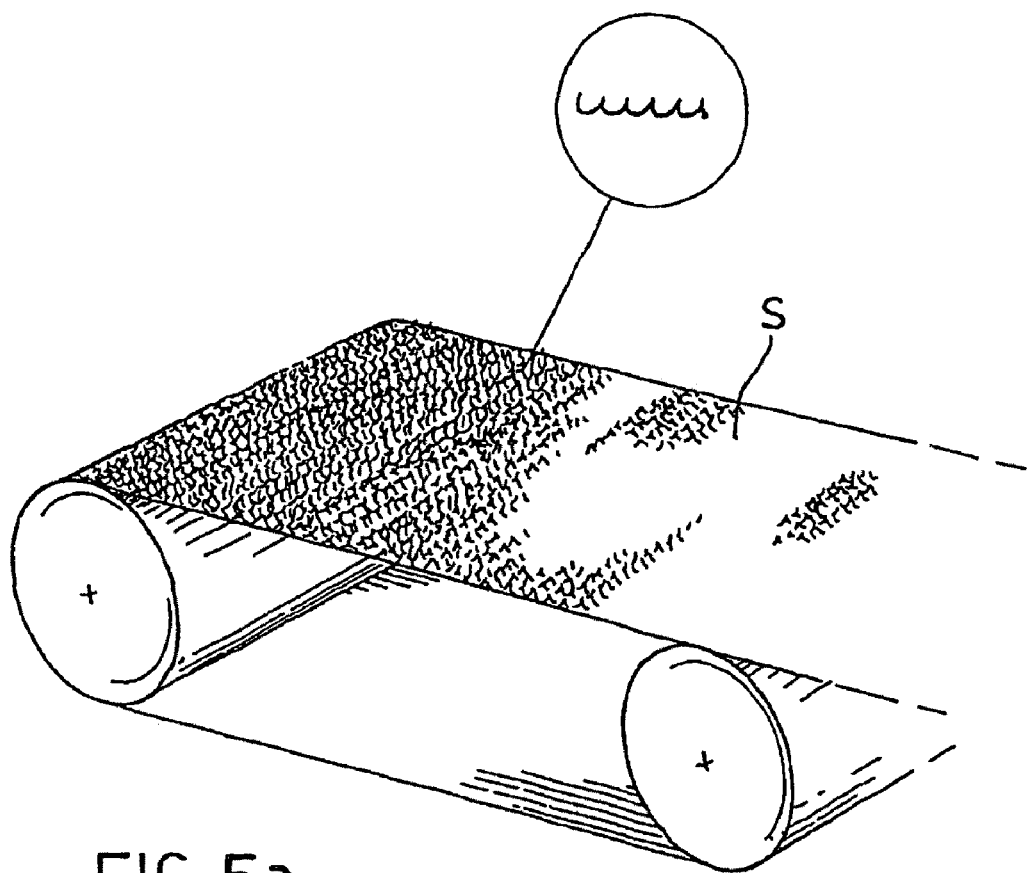
FIG. 5A is a perspective view of the support for the nonwoven fibres or microfibres of the invention.

FIG. 5a shows a digital photograph of a 2.2 dtx polymer ply of the spunbonded type obtained in accordance with suitable procedures. It can be seen that the ply has a compact and thin appearance like a sheet of tissue paper.

Figure 5B:
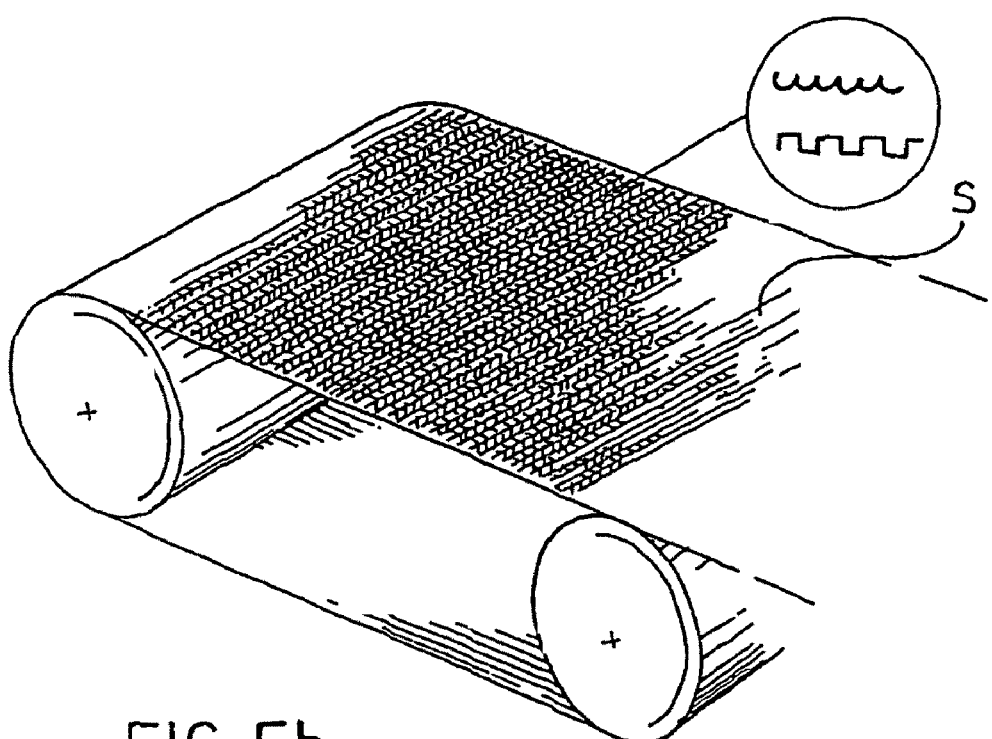
FIG. 5B is a perspective view of a variant of the support for the nonwoven fibres or microfibres of the invention.

FIG. 5b shows a digital photograph of a 2.2 dtx polymer fibre ply of the spunbonded type obtained in accordance with the method of the present invention. It can be seen that the ply has a soft and thick cotton wool-like appearance.

A non-limiting example of one embodiment of the process according to the present invention is described below.

EXAMPLE

Isotactic polypropylene polymer material has been employed to carry out this example, having a melt flow rate of 40 g/10 min, such as established by ASTM D-1238, in the form of "chips". The polymer has been loaded in an extruder connected to a spinneret having an operating pressure of about 9646 kPa. The spinneret consists of capillaries having a diameter of 0.038 cm and a slot length of 0.152 cm. The molten isotactic polypropylene passes through the spinnerets at a speed of 0.6 g/min/hole and is extruded at a temperature of 227° C. The polymer is random laid on a perforated support having a fibre-collecting surface provided with cube-shaped ribs of 1 mm-long side and alternating with specular grooves. Subsequently, the support is moved forward until reaching two rollers of an embosser where it is pinched between said rollers together with the non-consolidated polymer fibre ply carried thereonto. The pressure applied by the embosser, which normally ranges between 10 and 100 N/mm, is about 45 N/mm whereas the operating temperature, which normally ranges between 80 and 200° C., is 140° C. the rotation and dragging speed of the ply, which varies between 20 and 600 m/min, is 300 m/min. At the calender outlet, the consolidated ply has a cotton wool-like appearance, is soft, has a weight in grams ranging between 17 and 18 g/m$^2$ and is up to five times thicker than a spunbonded nonwoven of the same weight in grams, which is usually no more than 0.18 mm thick. Now, the continuous ply is winded on a roll to be then carried to a subsequent manufacturing line or, in the case of in-line operation, to the hydro-entangling station to be subjected to the normal treating conditions. It should be noted, however, that the end product does not exhibit substantial modifications of the tactile, thickness and functional characteristics such as described above.

It should be appreciated by what has been stated above that the present patent application provides a method for manufacturing a particularly soft, smooth and thick nonwoven, as well as a nonwoven obtainable by said method.

Furthermore, those of ordinary skill in the art may carry out a number of modifications both to the method and the nonwoven, all being within the scope of protection of the claims appended herein.

Figure 7:
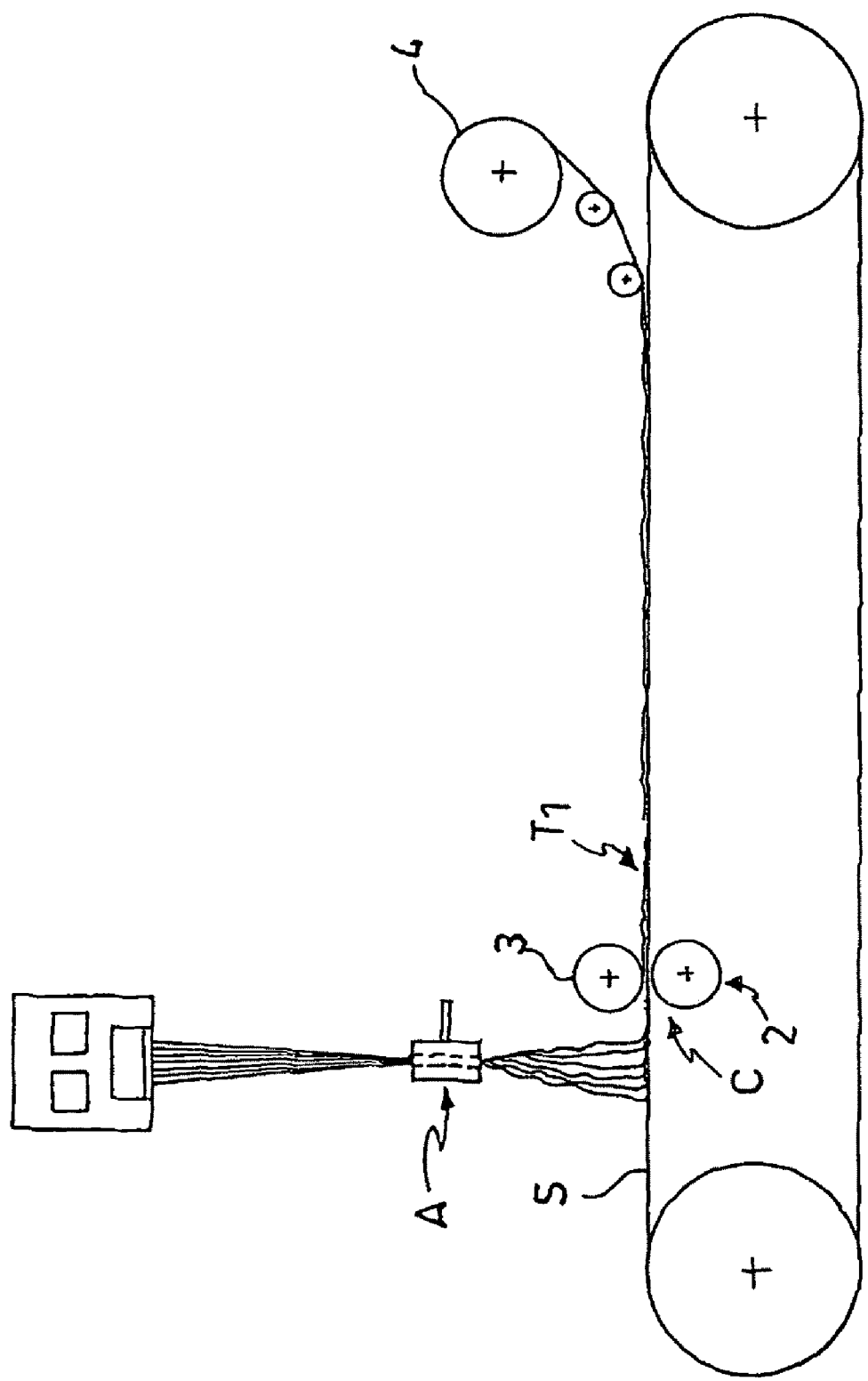
FIG. 7 is a schematic view of a manufacturing process in accordance with a sixth variant embodiment of the invention.
Figure 8:
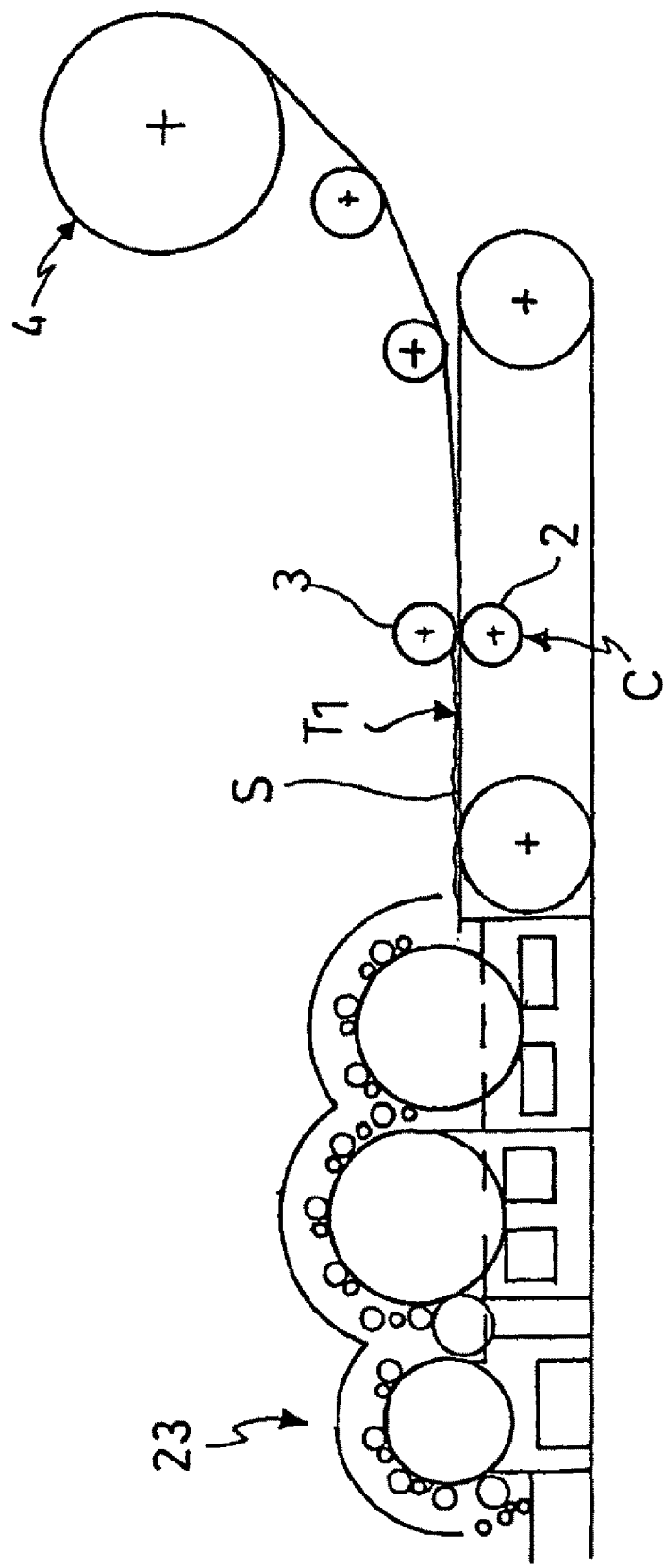
FIG. 8 is a schematic view of a manufacturing process in accordance with a seventh variant embodiment of the invention.

For example, the method may provide only the first two steps a) and b), and the winding of the spunbonded or carded nonwoven ply on a suitable winder, such as illustrated in FIGS. 7 and 8, respectively.

Particularly, in FIG. 8 is schematically represented a method for manufacturing a carded nonwoven wherein the same reference numbers as the reference numbers of the prior embodiments indicate the same working stations.

A carding machine 23 lays, in a fully conventional manner, a nonwoven layer $T_1$ on a support S such as that described above. Subsequently, the support S with layer $T_1$ passes through the rollers 2 and 3 of either the compactor or embosser C to be preconsolidated and mainly to increase its volume, such as extensively described above. Finally, said layer $T_1$ is wound on a roller 4.

Figure 9:
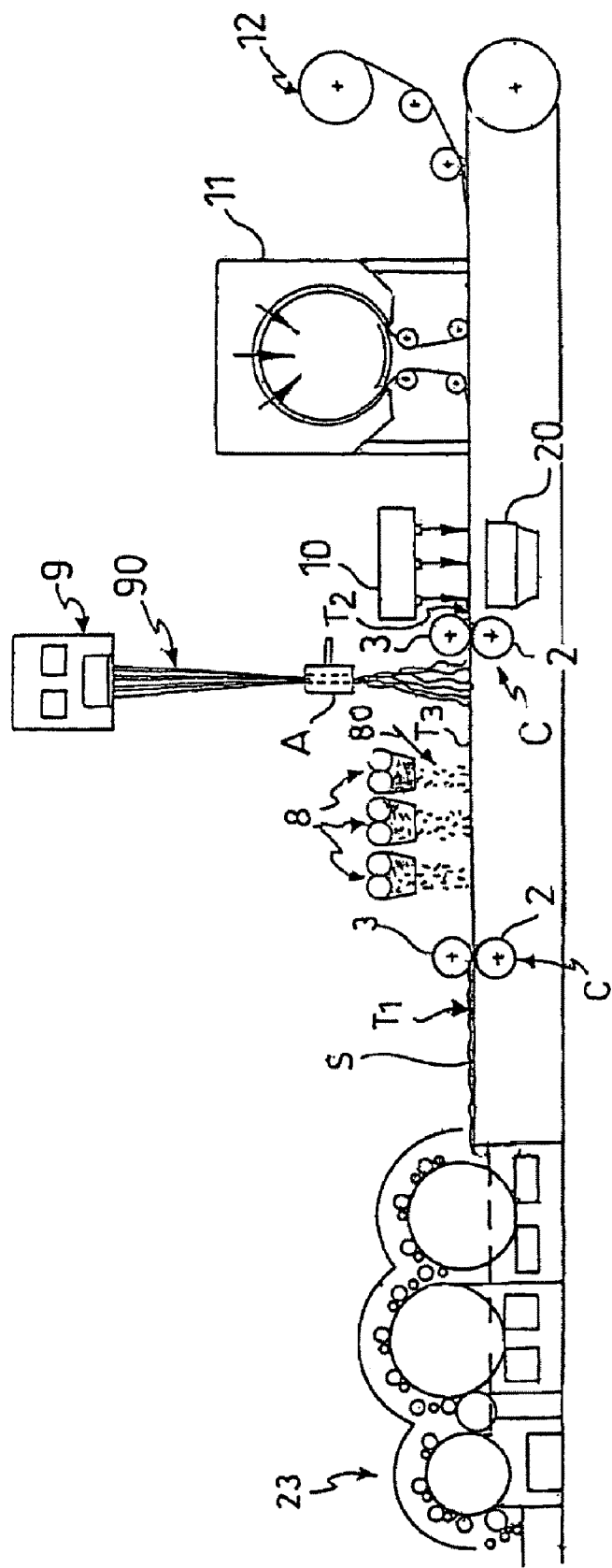
FIG. 9 is a schematic view of a manufacturing process in accordance with an eighth variant embodiment of the invention.

Referring to FIG. 9 wherein the same reference numbers as the reference numbers in FIG. 3a designate the same working stations, there is schematically represented a manufacturing line or a method for manufacturing a three-layer carded/cellulose pulp/spunbonded mixed nonwoven.

Compared to the method described in FIG. 3a, this method is different in that the first spinneret 7 for laying the first nonwoven layer $T_1$ is replaced with a conventional carding machine 23.

Figure 4A:
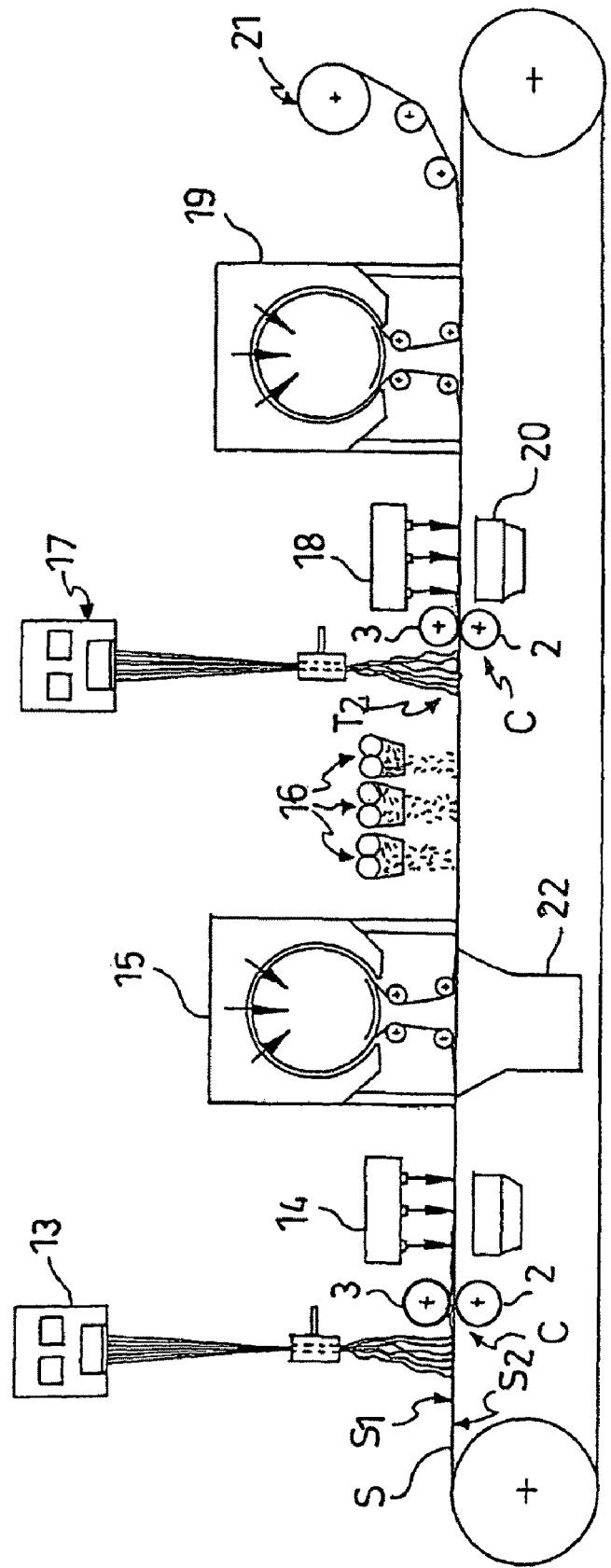
FIG. 4a is a schematic view of a manufacturing process in accordance with a fourth variant embodiment of the invention.
Figure 4B:
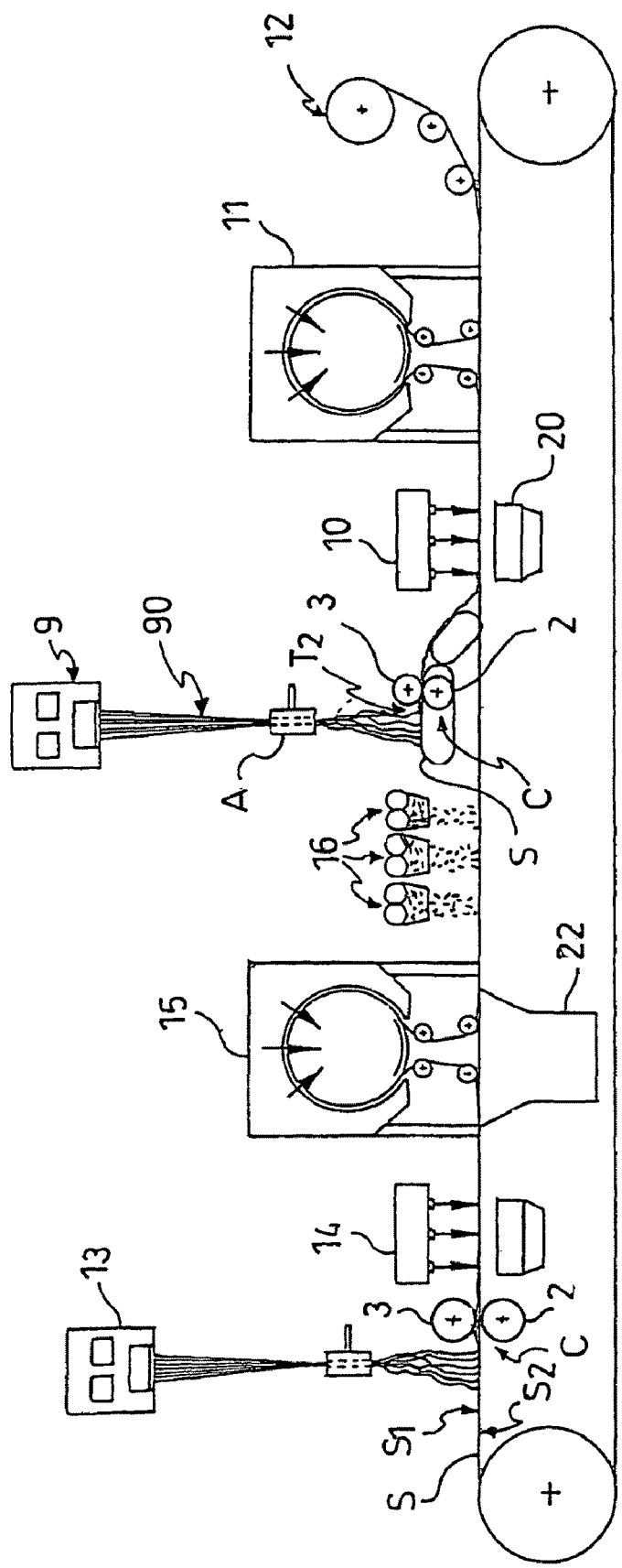
FIG. 4b is a schematic view of a manufacturing process in accordance with a fifth variant embodiment.
Figure 10:
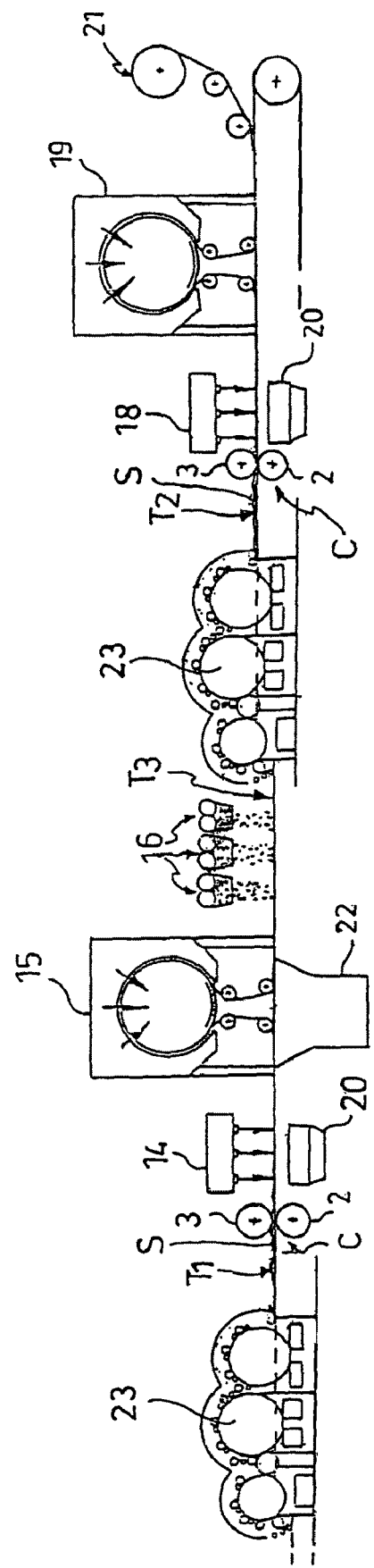
FIG. 10 is a schematic view of a manufacturing process in accordance with a ninth variant embodiment of the invention.

Similarly, FIG. 10 illustrate a schematic view of a manufacturing method for a three-layer carded/cellulose pulp/carded nonwoven wherein the spinnerets 13 and 17 from FIG. 4a are replaced with two respective carding machines 23.

It should be noted that, also in this case, all the variants discussed above are valid, i.e. the nonwoven layers can be previously hydro-entangled, the second nonwoven layer $T_2$ can be laid and passed through the compactor or embosser on a different level from any previous laying of fibers and the above-mentioned supplementary machining operations such as moulding and decoration (thermo-embossing) may be provided.

Furthermore, in the mixed multi-layer nonwoven, either the first laid layer, such as illustrated in FIG. 9, or the second layer can be the carded layer.

Consequently, according to the concept at the heart of the present invention, the spinneret (extruder) for manufacturing spunbonded fibers can be replaced with carding machines, which are known to work with fibre flocks (1.5-7 cm long staple fibres such as PES, PP, PLA, LYOCELL, TENCELL, COTTON). In this case, step b) of treatment to provide the nonwoven ply with the above-mentioned swollen appearance, a cotton wool-like thickness and softness will be always obtained by employing the compactor such as described above.

Advantageously, the inventive method may further provide the use of fibers or microfibres both of the spunbonded type, such as discussed above, and fibre flocks (staple fibers) which are typical of a carding operation. As a result, the passage through a ply-thickness increasing device, such as described above, will be entirely similar.

Figure 11:
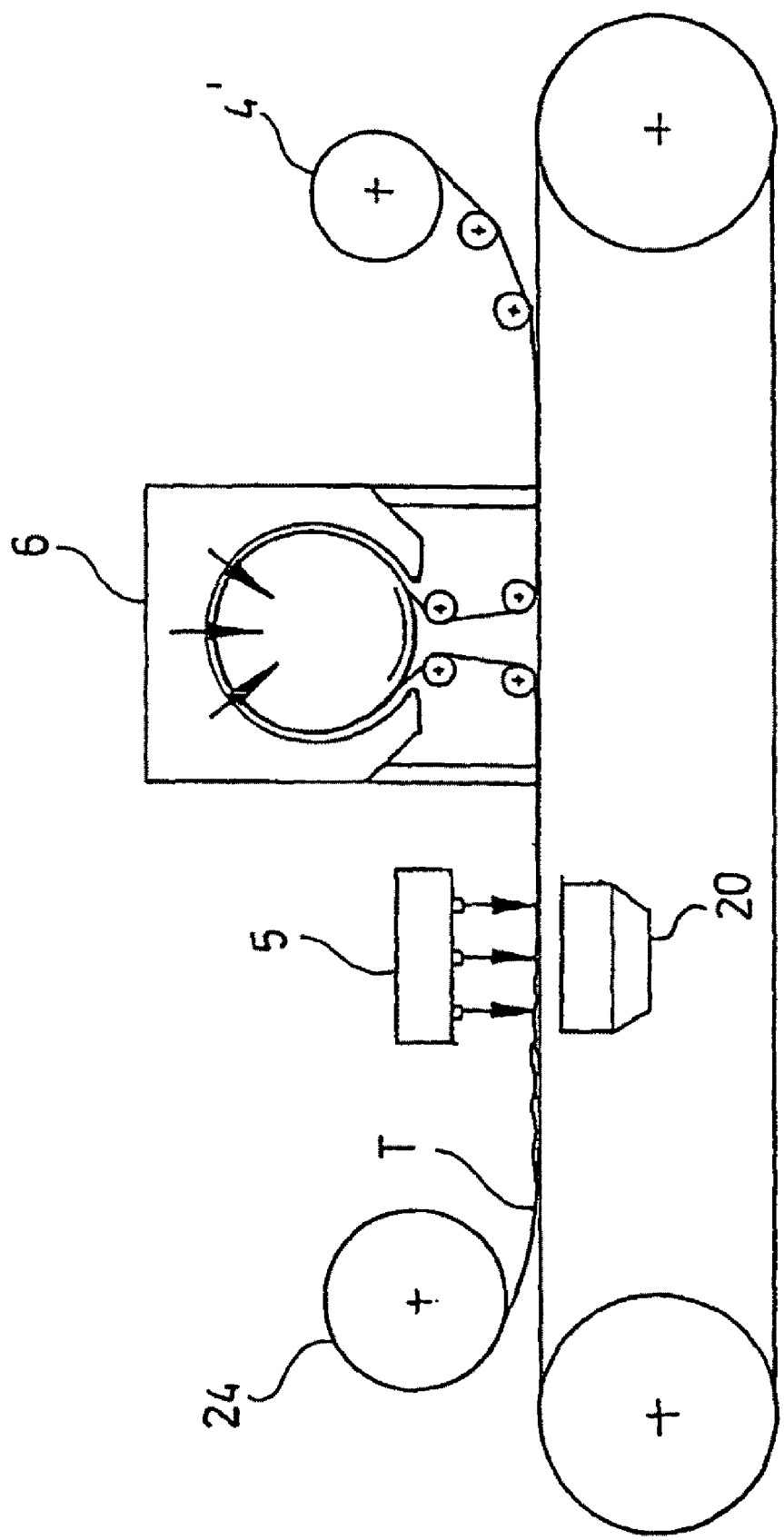
FIG. 11 is a schematic view of a manufacturing process in accordance with a tenth variant embodiment of the invention.
Figure 12:
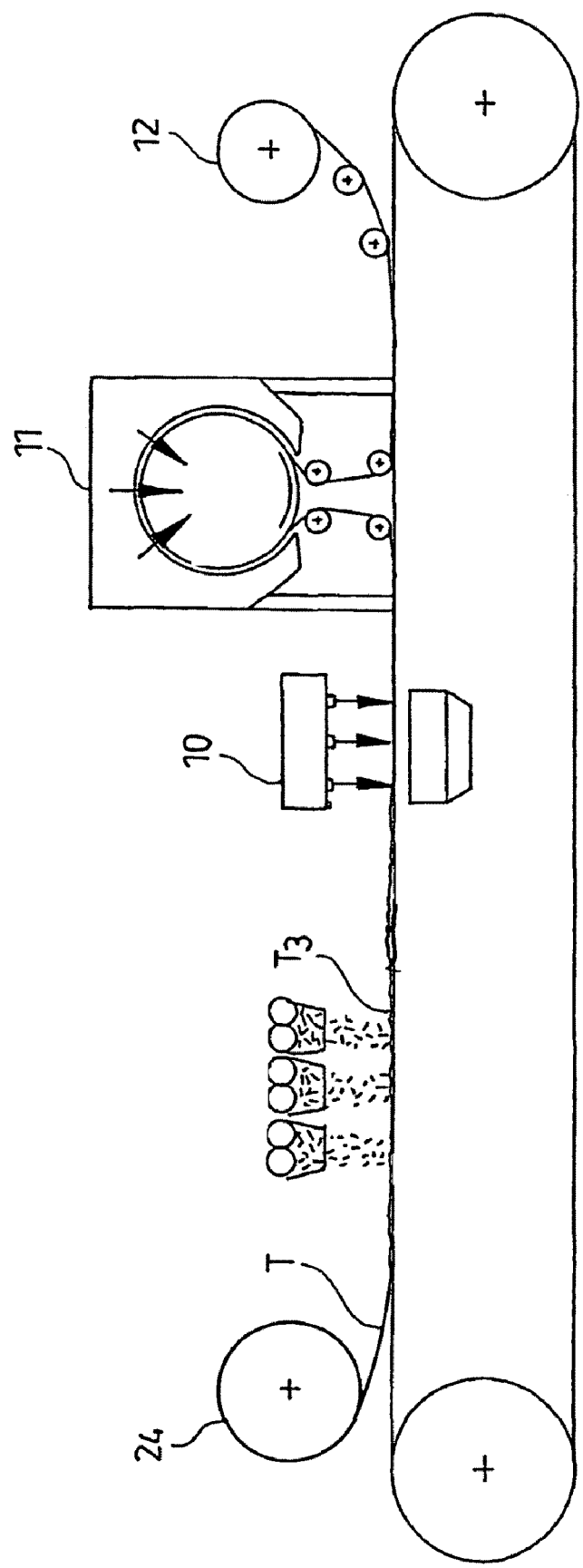
FIG. 12 is a schematic view of a manufacturing process in accordance with an eleventh variant embodiment of the invention.
Figure 13:
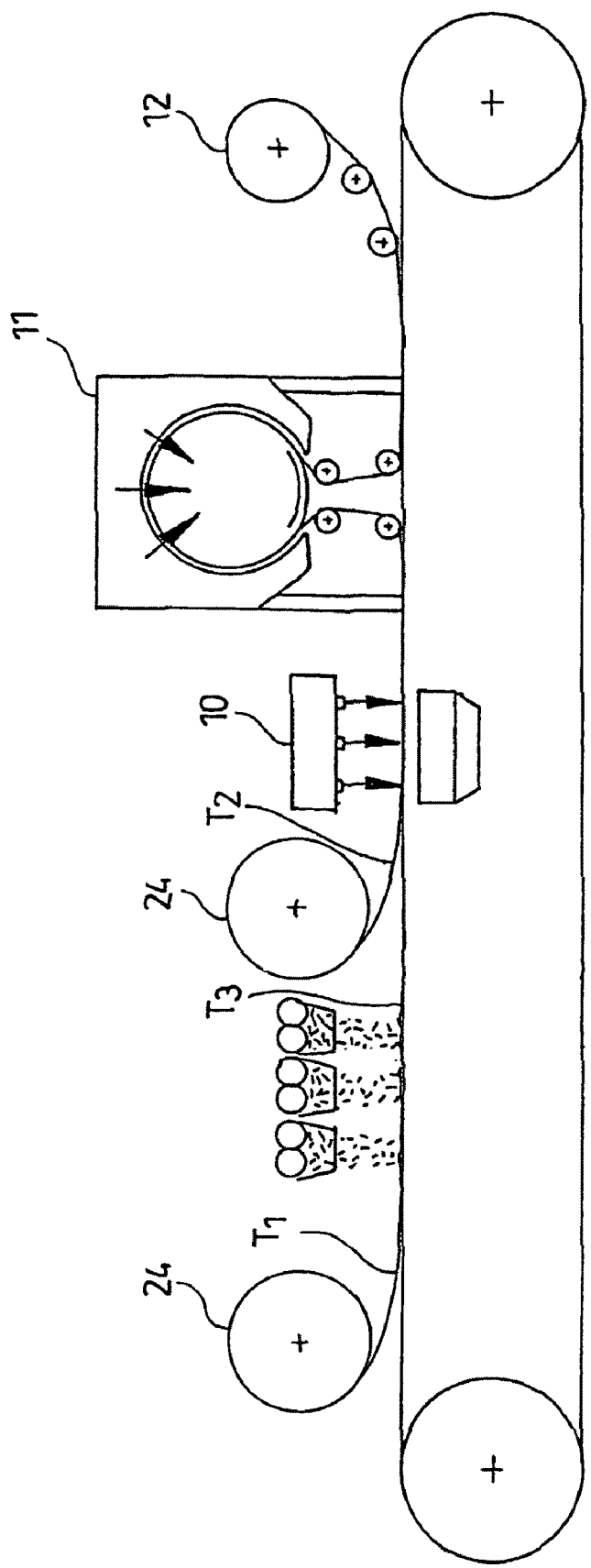
FIG. 13 is a schematic view of a manufacturing process in accordance with a twelfth variant embodiment of the invention.

In addition, in FIG. 11 there is illustrated a manufacturing method in which a roller 24 of spunbonded or carded staple fibers, treated only by a compactor or embosser such as discussed above, is subjected to machining in a different line, in accordance with what has been already discussed above. Particularly, the nonwoven ply T is unwound from roller 24 and subjected for example to hydro-entangling by equipment 5, similarly to what has been described above, then it is dried and finally wound again on a roller 4'.

Similarly to what has been illustrated in FIGS. 2 and 3a, FIGS. 12 and 13 represent identical methods, wherein, again, a roller 24 of spunbonded or carded staple fibers replaces the spinnerets and the carding machines for laying said fibers, respectively; the other machining operation remaining unchanged. In both latter cases, the variant embodiments described above may be also adopted, such as employing two rollers carrying the same fabric of the type spunbonded/spunbonded, carded spunbonded/staple fibers or carded staple fibers/staple fibers treated by compactor or embosser.

The invention claimed is:

1. A method for manufacturing spunbonded nonwoven, comprising the following sequential steps; a) laying at least one layer of fibres or microfibres of spunbonded nonwoven on a suitable support; b) treating said layer such as to obtain an increase in the thickness thereof, wherein said step b) comprises passing said at least one layer of fibres or microfibres between two opposed rollers on said support having a contact surface with said fibres or microfibres provided with ribs alternating with grooves, and wherein the roller underlying said support with ribs and grooves is provided with a thermoplastic smooth rubber outer surface and the opposing roller is provided with a single smooth metal outer surface that contacts the fibres or microfibres of the spunbound nonwoven and is subject to heating at the melting temperature of said fibres or microfibres, and wherein the ribs of said support face the opposing roller provided with a smooth metal outer contact surface that contacts the fibres or microfibres of the spunbound nonwoven.

2. The method according to claim 1, wherein said step b) takes place by treatment with a compactor.

3. The method according to claim 1, wherein said support has sectional crimps, steps, dots or line dashes suitable to give three dimensionality to the fibers or microfibres laid thereon.

4. The method according to claim 1, wherein said support is a conveyor belt or tape made of a hard heat-resistant plastic material or a metal sheet.

5. The method according to claim 1, wherein said support is drilled such as to allow for the air to be sucked through the thickness thereof.

6. The method according to claim 1, wherein step a) comprises laying at least one layer of staple fibres such as PES, PP, PLA, viscose, lyocell, tencell or cotton by means of carding.

7. The method according to claim 1, wherein step a) comprises extruding continuous thread fibers or microfibres through spinnerets (1, 7, 9, 13, 17) and laying them on said support.

8. The method according to claim 7, wherein said laying takes place by means of a suction fan (A).

9. The method according to claim 1, wherein said step a) comprises preparing at least one layer of multi-component polymer fibers that can be split into microfibres and entangled to one another through hydro- entangling and laying said layer on said support.

10. The method according to claim 1, wherein said step a) comprises preparing at least one layer of exploded polymer microfibres or exploded natural microfibres that can be entangled to one another by means of hydro-entanglement and laying said layer on said support.

11. The method according to claim 1, further comprising a step of laying at least one layer of absorbent material fibers on said nonwoven layer subsequent to said step b).

12. The method according to claim 11, further comprising a step of laying at least one further layer of spunbonded fibers or microfibres on said at least one layer of fibers of absorbent material and a step of treating said at least one further layer of spunbonded fibers or microfibres such as to obtain an increase in the thickness thereof.

13. The method according to claim 12, wherein said step of treating said at least one further layer of spunbonded fibers or microfibres such as to obtain an increase in the thickness thereof comprises passing said at least one further layer between two rollers on a support having a contact surface with said fibers or microfibres provided with ribs alternating with grooves.

14. The method according to claim 9, wherein said passage a) is carried out by separate extrusion of at least two polymer components from a suitable spinneret beneath of which said at least two polymer components are linked such as to form one single splittable multi-component fibre.

15. The method according to claim 14, wherein said splittable multi-component fibre is obtained by spinning and subsequently linking up to 16 continuous threads of various polymers.

16. The method according to claim 14, wherein said polymer fibers derive from at least two threads of one only polymer up to 16 threads of various polymers, be they homopolymers, copolymers or blends thereof.

17. The method according to claim 16, wherein said polymers are selected among polyesters, polyamides, polyolefins, polyurethane, polyester modified with additives, polypropylene terephthalate, polybutylene terephthalate.

18. The method according to claim 10, wherein the exploded polymer fibers are obtained by passing polymer fibers through a Laval nozzle.

19. The method according to claim 18, wherein the polymers of the exploded fibers are selected among natural or synthetic polymers.

20. The method according to claim 19, wherein the natural polymers are selected among cellulose, Lyocell and PLiA, whereas the synthetic polymers are selected among polypropylene, polyethylene, polyamide and polyester.

21. The method according to claim 11, wherein said laying of absorbent material is carried out with cellulose pulp fibers.

22. The method according to claim 12, further comprising a step of consolidating said at least one layer of spunbonded nonwoven fibres or microfibres and/or said at least one further layer of spunbonded fibers or microfibres after step b) of treatment to obtain an increase in the thickness thereof.

23. The method according to claim 22, wherein said step of consolidate takes place through hydro-entanglement.

24. The method according to claim 23, further comprising a drying step after the hydro-entangling step.

25. The method according to claim 24, further comprising a step of winding the nonwoven on a roller after said drying step.

26. The method according to claim 12, further comprising a step of pre-hydro-entanglement after said step of preparing at least one layer of fibers.

27. The method according to claim 26, further comprising a drying step after said pre-hydro-entanglement step.

28. The method according to claim 24, further comprising a dewatering step, either simultaneous or subsequent to said drying step.

29. The method according to claim 24, further comprising a step of winding the nonwoven on a roller after said drying step.

30. The method according to claim 29, further comprising an embossing step before the winding step.

31. The method according to claim 29, wherein said embossing is carried out by calendering or hydro-entanglement.

32. The method according to claim 1, wherein air is sucked at a temperature either equal to or lower than room temperature through said polymer fibers in order to cool and harden them.

33. The method according to claim 10, wherein said exploded fibers are humidified before being hydro-entangled.

34. The method according to claim 1, further comprising a step of finishing the nonwoven.

35. The method according to claim 1, further comprising a step of multicolour printing of the nonwoven.

36. The method according to claim 1, wherein said support has a surface comprising sections with a substantially perpendicular profile to the vertical laying flow of the fibers alternating with sections with a profile biased of 10°-50° relative to said vertical flow.

37. The method according to claim 12, wherein said at least one further layer of spunbonded fibers or microfibres is laid on a support which is identical to said support but placed on a different level.

* * * * *